(12) United States Patent
Noda (10) Patent No.: US 11,085,940 B2
(45) Date of Patent: Aug. 10, 2021

(54) AUTOMATIC ANALYZER (71) Applicant: HITACHI HIGH-TECHNOLOGIES CORPORATION, Tokyo (JP)

(72) Inventor: Takayuki Noda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 200 days.

(21) Appl. No.: 15/748,733

(22) PCT Filed: Jul. 11, 2016

(86) PCT No.: PCT/JP2016/070423
§ 371 (c)(1),
(2) Date: Jan. 30, 2018

(87) PCT Pub. No.: WO2017/033598
PCT Pub. Date: Mar. 2, 2017

(65) Prior Publication Data
US 2019/0011468 A1 Jan. 10, 2019

(30) Foreign Application Priority Data
Aug. 26, 2015 (JP) .............................. JP2015-167061

(51) Int. Cl.
G01N 35/00 (2006.01)
G01N 35/10 (2006.01)
(Continued)

(52) U.S. Cl.
CPC . *G01N 35/00722* (2013.01); *G01N 35/00712* (2013.01); *G01N 35/1002* (2013.01);
(Continued)

(58) Field of Classification Search
CPC ....... G01N 35/00722; G01N 35/00712; G01N 35/1002; G01N 35/026; G01N 35/00;
(Continued)

(56) References Cited

U.S. PATENT DOCUMENTS 6,673,316 B1 * 1/2004 Okamoto ............... B01J 19/004
422/63
2005/0142033 A1 * 6/2005 Glezer ................... G01N 21/66
422/400
(Continued)

FOREIGN PATENT DOCUMENTS

EP 0359049 A2 * 3/1990 ....... G01N 35/00712
EP 0359049 A2 3/1990
(Continued)

OTHER PUBLICATIONS

Extended European Search Report received in corresponding European Application No. 16838945.0 dated Apr. 1, 2019.
(Continued)

*Primary Examiner* — Kathryn Wright
*Assistant Examiner* — Curtis A Thompson
(74) *Attorney, Agent, or Firm* — Mattingly & Malur, PC (57) ABSTRACT

The automatic analyzer includes a sample storage section for accommodating a plurality of samples, a reagent storage section for accommodating a plurality of reagents, an analysis section for carrying out an analysis by reacting the sample with the reagent, a display, a storage section for storing a setting of an operation item to be automatically executed, which is effective only at restarting, and a control section which displays a screen for setting the operation item to be automatically executed upon acceptance of power shutdown operation by an operator during the analysis on the display to accept the setting from the operator, and automatically executes or omits execution of the operation item to be automatically executed, which has been set by the operator in accordance with the setting read from the storage section at the restarting.

2 Claims, 6 Drawing Sheets (51) Int. Cl.
*G01N 35/04* (2006.01)
*G01N 35/02* (2006.01)

(52) U.S. Cl.
CPC ....... *G01N 35/00* (2013.01); *G01N 35/00584* (2013.01); *G01N 35/00732* (2013.01); *G01N 35/026* (2013.01); *G01N 35/1004* (2013.01); *G01N 35/1009* (2013.01); *G01N 2035/0091* (2013.01); *G01N 2035/00386* (2013.01); *G01N 2035/00435* (2013.01); *G01N 2035/00891* (2013.01); *G01N 2035/0443* (2013.01); *G01N 2035/0451* (2013.01); *G01N 2035/0455* (2013.01); *G01N 2035/1013* (2013.01); *Y10T 436/11* (2015.01); *Y10T 436/111666* (2015.01)

(58) Field of Classification Search
CPC ......... G01N 35/00732; G01N 35/2035; G01N 35/00435; G01N 2035/0443; G01N 2035/0455; G01N 2035/0451; G01N 2035/00386; G01N 2035/1013; G01N 35/1004; G01N 35/1009; G01N 35/00584; G01N 2035/00891; G01N 2035/0091; Y10T 436/111666; Y10T 436/11
See application file for complete search history.

(56) References Cited

U.S. PATENT DOCUMENTS

| | | | |
|---|---|---|---|
| 2005/0175506 A1* | 8/2005 | Matsubara | G01N 35/00712 422/68.1 |
| 2008/0279048 A1* | 11/2008 | Wakamiya | G01N 35/00663 368/10 |
| 2010/0183216 A1* | 7/2010 | Yamada | G06K 9/00134 382/134 |
| 2011/0223063 A1* | 9/2011 | Katsumi | G01N 35/1002 422/68.1 |
| 2012/0109529 A1* | 5/2012 | Ariyoshi | G01N 1/312 702/19 |
| 2012/0251391 A1 | 10/2012 | Hagiwara et al. | |
| 2013/0011298 A1* | 1/2013 | Itou | G01N 35/00623 422/73 |
| 2013/0084213 A1* | 4/2013 | Nishikawa | G01N 35/00712 422/73 |
| 2013/0160533 A1* | 6/2013 | Fukuma | G01N 35/00 73/64.56 |
| 2015/0331401 A1* | 11/2015 | Yokoi | G05B 15/02 700/83 |
| 2020/0116746 A1* | 4/2020 | Sasaki | G01N 35/0092 |

FOREIGN PATENT DOCUMENTS

| | | | | |
|---|---|---|---|---|
| JP | 02-80962 A | | 3/1990 | |
| JP | H08338847 A | * | 12/1996 | ............ G01N 35/02 |
| JP | 2005-241612 A | | 9/2005 | |
| JP | 2010-223736 A | | 10/2010 | |
| JP | 2012-112832 A | | 6/2012 | |
| JP | 2017044507 A | * | 3/2017 | ............ G01N 35/00 |
| WO | 2011/078118 A1 | | 6/2011 | |

OTHER PUBLICATIONS

International Search Report of PCT/JP2016/070423 dated Oct. 11, 2016.
Chinese Office Action received in corresponding Chinese Application No. 201680045417.7 dated Dec. 26, 2019.

* cited by examiner

AUTOMATIC ANALYZER

TECHNICAL FIELD

The present invention relates to an automatic analyzer configured to process a plurality of samples simultaneously.

BACKGROUND ART

In the recent trend of increasing medical expense owing to rising aging rate and increase of cancer patients, principal medical institutions ready for the tertiary emergency care have been demanded to organize a system for accepting patients 24 hours adapted to diversified roles of hospital to suppress medical expenses. As a result, not only physicians and nurses (hereinafter referred to as "operator") but also medical instruments used for inspection of the patients are required to be kept on standby at any time.

Mostly, it is indispensable to use the medical instrument in accordance with the procedure specified in the instruction manual, and to conduct the maintenance work for the medical instrument on a regular basis. The operators tend to be brought into the situation requiring standing by the medical instrument for periodic maintenance for a long period of time.

Patent Literature 1 discloses a medical instrument configured to automatically execute a series of maintenance operations upon startup so as to secure the necessary maintenance work unattended until the start of the inspection. Patent Literature 2 discloses an immunoanalyzer configured to set the maintenance work executable parallel to the operation for the purpose of reducing the time for the maintenance work upon startup. Patent Literature 3 discloses an automatic analyzing system configured to separate some analysis modules from a plurality of analysis modules at the preliminarily fixed time so as to automatically execute the maintenance work.

Various systems have been proposed for securing as much of the time period for analyzing the sample as possible by reducing the time required for the maintenance work. However, since the maintenance work is indispensable, there is the medical institution which employs the same two medical instruments so as to be ready for executing the inspection 24 hours. The above-described institution will conduct the maintenance work for one of the medical instruments in a non-operation state while making the other into the standby state.

CITATION LIST

Patent Literature

Patent Literature 1: Japanese Unexamined Patent Application Publication No. Hei2(1990)-80962
Patent Literature 2: Japanese Unexamined Patent Application Publication (Translation of PCT Application) No. 2011/078118
Patent Literature 3: Japanese Unexamined Patent Application
Publication No. 2005-241612

SUMMARY OF INVENTION

Technical Problem

In the case where the power source of the medical instrument is turned off to cope with sudden failure or accidental event, and then activated (that is, restart) immediately, the above-described systems allow automatic execution of a series of initialization and automatic maintenance function, which are expected to be carried out upon normal startup. In such a case, the operator cannot start the inspection until the end of the maintenance operations.

Generally, it is possible to set the series of the automatically activated maintenance operations through the operation screen. For restarting the medical instrument, the automatic execution of the maintenance operations at restarting is preliminarily canceled so as to restart the inspection with no waiting time. The existing automatic analyzer includes no screen for setting the maintenance function exclusive for the next startup. Therefore, cancellation of the maintenance operation to be automatically activated may influence not only restarting but also normal startup.

After restarting, the sample that has been kept on standby has to be inspected as soon as possible. Furthermore, since restarting is an irregular operation, the operator may forget to reset the automatic maintenance operations which have been cancelled. In the above-described case, the automatic maintenance function cannot be activated at the normal startup. Consequently, the maintenance operation as the preprocess of the inspection cannot be started until a further instruction of the operator to execute the maintenance operation. If the operator's instruction to execute the maintenance operation is delayed, the maintenance cannot be finished by the scheduled time for starting the inspection.

The automatic maintenance operation includes an initializing operation as indispensable work for identifying the state of the medical instrument of its own. Execution of the initializing operation may identify each mechanism and each location of the respective sections, bringing those sections into controllable states. The initializing operation is executed to determine with respect to change in the state of the inspection reagent or expendables during the power-off time. The initializing operation is executed for confirming existence of the reagent bottle through barcode reading, and measuring the amount of reagent in the existing reagent bottle even if the operator knows that there is no additional reagent or expendable. The initializing operation may delay the start of the inspection. Therefore, establishment of the system which allows intervention of the operator to the initializing operation is desired.

It is an object of the present invention to provide the automatic analyzer capable of starting the inspection at the next startup without caring about forgetfulness of the operator with respect to resetting of the automatic maintenance function.

Solution to Problem

The present invention is implemented into the structure as described in the claims for solving the above-described problem. The specification includes a plurality of solutions against the problems, an example of which will be described as follows. The automatic analyzer includes a sample storage section for accommodating a plurality of samples, a reagent storage section for accommodating a plurality of reagents, an analysis section for carrying out an analysis by reacting the sample with the reagent, a display, a storage section for storing a setting of an operation item to be automatically executed, which is effective only at restarting, and a control section which displays a screen for setting the operation item to be automatically executed upon acceptance of power shutdown operation by an operator during the analysis on the display to accept the setting from the operator, and automatically executes or omits execution of the operation item to be automatically executed, which has been set by the operator in accordance with the setting read from the storage section at the restarting.

Advantageous Effects of Invention

According to the present invention, the automatic analyzer is capable of starting the inspection at the next startup without caring about forgetfulness of the operator with respect to resetting of the automatic maintenance function. The problem, structure, and advantageous effects other than those described above will be clarified by the following description.

DESCRIPTION OF EMBODIMENTS

Embodiments according to the present invention will be described referring to the drawings. Embodiments according to the present invention are not limited to examples described below, and may be modified into various forms without departing from the scope of the present invention.

(1) Example 1

(1-1) Structure of Analyzer

Figure 1:
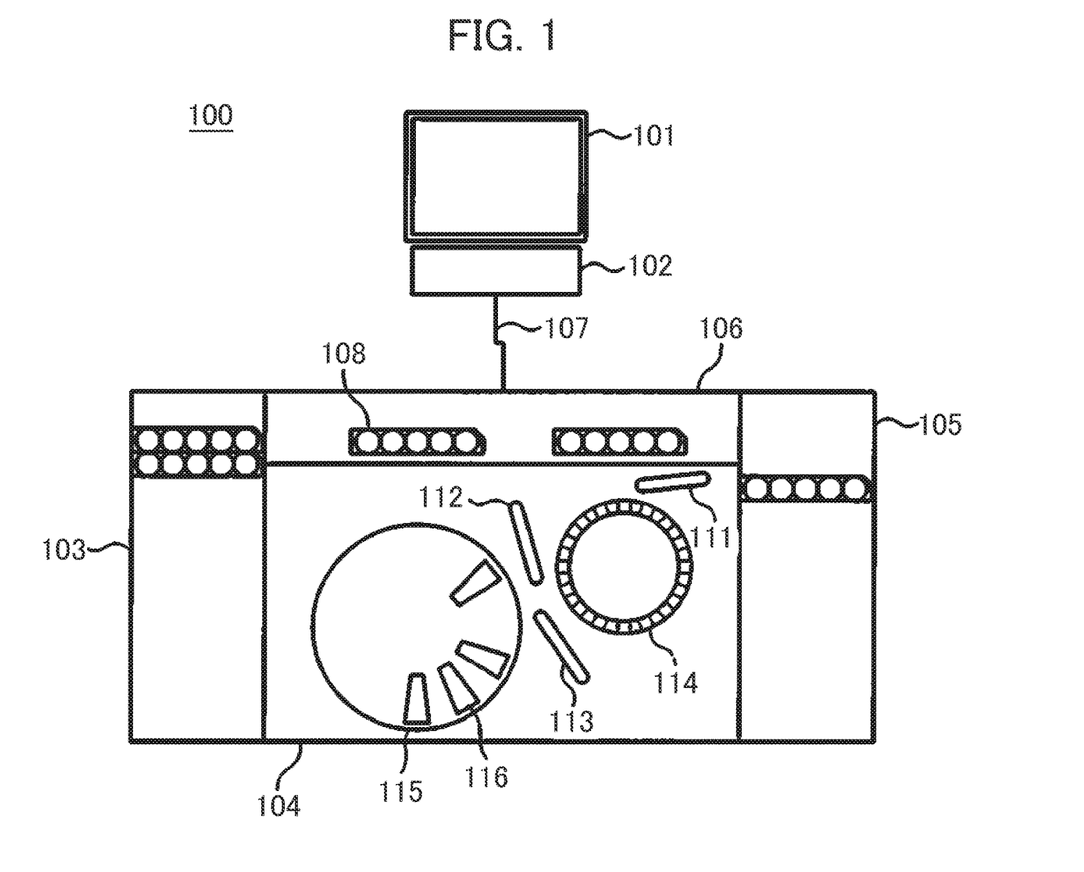
FIG. 1 is a view schematically showing a structure of an automatic analyzer according to an example.

FIG. 1 shows an exemplary structure of an automatic analyzer 100. An operation section 102 includes a computer (a CPU, a storage section, an interface) for controlling operations of the entire analyzer including an analysis section. The CPU functions as a control section for controlling operations of the analysis section through execution of the program. The operation section 102 displays various information on an associated display 101 so as to notify the operator of the state of the automatic analyzer 100. The operation section 102 displays various operation screens on the display 101 so as to allow the operator to input through the operation screen for controlling operations of the automatic analyzer 100.

The operation section 102 is connected to a main body of the analyzer via a connection cable 107. The main body of the analyzer includes a sample charging section 103 for accommodating a sample container 108, an analysis section 104 in which the sample dispensed into a reaction vessel reacts with the reagent for analysis, a sample storage section 105 for storing the analyzed sample, and a sample carrier section 106 for carrying the sample container 108. The sample carrier section 106 includes a lane for transversely linking the sample charging section 103, the analysis section 104, and the sample storage section 105. The sample container 108 is carried while being held in a holder (cup, rack and the like).

The analysis section 104 includes a sample dispensation mechanism 111 for distributing the sample (specimen) from the sample container 108, a reaction disk 114 for circumferentially accommodating the reaction vessel in which the dispensed sample is reacted with the reagent, a reagent disk (reagent storage unit) 115 capable of accommodating a plurality of reagent bottles 116 while rotating in accordance with the inspection item, and a first reagent dispensation mechanism (112) and a second reagent dispensation mechanism (113) each for dispensing the reagent distributed from the reagent bottle 116 into the reaction vessel on the reaction disk 114. Generally, two types of reagent, that is, the first reagent and the second reagent are used for the normal inspection. Accordingly, the analysis section 104 includes two reagent dispensation mechanisms. The reaction disk 114 includes an incubation bath filled with water where the reaction vessel is immersed and stored. As the reaction vessel is immersed in water of the incubation bath, the temperature at which the sample is reacted with the reagent in the reaction vessel is kept constant.

(1-2) Setting Screen for Operation Item Effective Only at Restarting (Next Startup)

The operation section 102 according to this example includes the function for displaying the screen that accepts setting of the item to be automatically executed, which is effective only at restarting as the function for solving the above-described problem. The startup process to be executed immediately after shutdown of the power of the automatic analyzer 100 for coping with contingencies during inspection will be expressed as "restarting", and the startup process to be executed at the next startup after shutdown of the power of the automatic analyzer 100 at the end of the inspection will be expressed as "normal startup".

Figure 2:
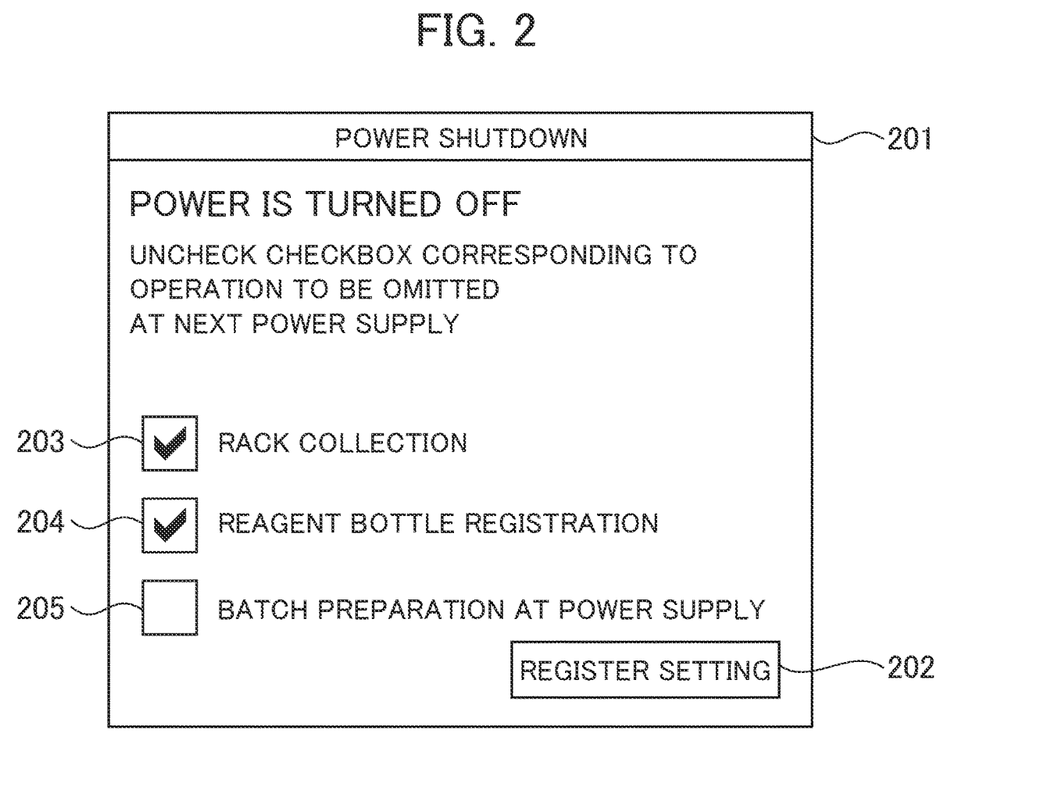
FIG. 2 is a view showing an exemplary setting screen displayed at power shutdown during inspection.

FIG. 2 shows an exemplary power shutdown screen 201 described in this example. The power shutdown screen 201 is displayed on the display 101 in response to detection of the operator's depression of a power (OFF) switch by the operation section 102. In reference to the power shutdown screen 201, the operator sets execution or non-execution of the operation item, which is effective only at restarting (next startup). The operation items to be displayed on the power shutdown screen 201 have to be executed by the operation section 102 for recognizing the current state. However, the operator is capable of recognizing the current state of those items.

Referring to FIG. 2, the power shutdown screen 201 includes a checkbox 203 for designating execution/non-execution of a rack collection operation, a checkbox 204 for designating execution/non-execution of a reagent bottle registration operation, a checkbox 205 for designating execution/non-execution of a batch preparation operation at power supply, and a setting registration button 202. Those operation items required to be executed at normal startup have already been confirmed by the operation section 102 at the normal startup before a contingency occurs. It is therefore possible to omit overlapped execution of the operation item with no change in the condition from the power shutdown to restarting.

Referring to the example of FIG. 2, the operations corresponding to the checked checkboxes are executed, and the operation corresponding to the unchecked checkbox is not executed. Execution or non-execution of the operation items upon restarting (next startup) corresponding to checked states of those three checkboxes 203 to 205 will be registered in an unshown storage section by the operator's depression of the setting registration button 202.

Unlike the conventional setting for specifying the operation to be executed at every startup, the setting described herein is effective only at restarting (next startup). The power shutdown screen 201 displays three checkboxes. However, arbitrary number of checkboxes, for example, two, four or more may be displayed in accordance with configuration of the automatic analyzer 100. The combination of the operation items corresponding to the respective checkboxes is not limited to the one as shown in FIG. 2.

(1-3) Normal Operation

General operations of the automatic analyzer will be described for easy understanding of the process executed through the above-described power shutdown screen 201. At every starting of the operation, upon the operator's depression of a not shown power (on) switch disposed on the sample charging section 103, power is supplied to the respective sections which constitute the automatic analyzer 100 so as to start the predetermined operation. Firstly, the computer operating system is activated for synchronization with the respective sections through communication.

Then the CPU executes a series of operations which have been set to be automatically executed at the normal startup. First of all, the CPU executes the reset operation to locate the respective mechanisms. In the reset operation, the CPU moves the respective mechanisms to the initial positions. Simultaneously with the reset operation, the CPU stores the sample container 108 left in the sample carrier section 106 into the sample storage section 105. If a plurality of sample containers 108 exist, the CPU have to transfer all of them. The transfer requires time in accordance with the number of the remaining sample containers 108.

The CPU drives the reagent disk 115 for rotation to confirm all locations at which the reagent bottles are mounted for checking environmental change during the power shutdown (for example, whether the additional reagent bottle has been newly mounted on the reagent disk 115, or whether the used reagent bottle has been removed from the reagent disk 115). If the newly added reagent bottle is found, the CPU confirms the residual amount of the reagent. Substantial time will be taken for confirming the residual amount because the automatic analyzer 100 can accommodate tens of reagent bottles.

At the end of the process for initializing the mechanism position, and the process for recognizing the reagent bottles, the CPU will execute the batch preparation operation conforming to, if any, designation by the user. In the batch preparation operation, the maintenance operations of several items in usual state will be sequentially executed, that is, calibrating the reaction cell, exchanging water in the incubation bath, replacing water in the flow passages for the respective dispensation mechanisms, and confirming conditions of the measuring instruments for measuring the reaction solution. At the end of the batch preparation operation, the automatic analyzer 100 is brought into the standby state, waiting for the instruction of the operator. In this stage, upon reception of the operator's instruction for executing the inspection, the automatic analyzer starts the inspection.

At the end of the inspection, the operator confirms whether the remaining sample exists. Upon the operator's depression of the power (off) switch (not shown) on the sample charging section 103, the CPU starts executing the end processing. That is, the CPU shuts down the operating systems for the respective computers to cut off the power supply circuit. After turning off the power of the analyzer, the operator executes the maintenance operation such as cleaning of the respective parts as specified by the instruction manual so as to be ready for the inspection to be executed on the following day.

(1-4) Process Executed by Operation Section 102

(1-4-1) Process Executed at Power Shutdown During Inspection

Figure 3:
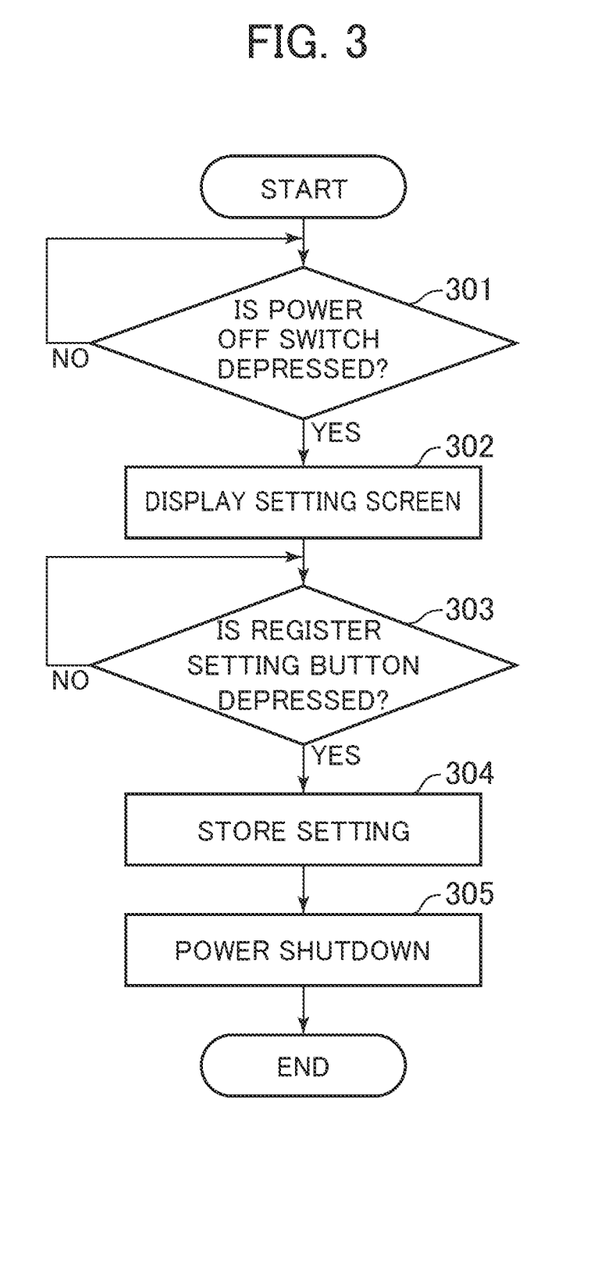
FIG. 3 is a flowchart representing exemplary process steps executed at power shutdown during inspection.

Referring to FIG. 3, the process to be executed at power shutdown by the operation section 102 will be described. The operation section 102 constantly monitors whether the power (OFF) switch has been depressed during the inspection (step 301). In response to the operator's depression of the power (OFF) switch during the inspection, the operation section 102 executes a setting screen display process (step 302) to display the power shutdown screen 201 (FIG. 2) on the display 101.

While the power shutdown screen 201 is displayed, the operation section 102 judges whether the setting registration button 202 has been depressed (step 303). Upon the operator's depression of the setting registration button 202, the operation section 102 stores the setting relating to "execution" or "non-execution" of the operation item in the not shown storage section (for example, hard disk)(step 304). In other words, the operation section 102 reads the respective checked states of the checkboxes 203 to 205 on the power shutdown screen 201. The operation section stores "execution" of the operation item corresponding to the checked checkbox, and stores "non-execution" of the operation item corresponding to the unchecked checkbox.

Thereafter, the operation section 102 executes the power shutdown process (step 305). In the power shutdown process, each operating system of the computers is shut down, and the power supply circuit is also shut down. While the power of the automatic analyzer 100 is turned off, the setting information of the respective checkboxes will be retained in the storage section such as the hard disk.

(1-4-2) Process Operation Executed at Restarting (Next Startup)

Figure 4:
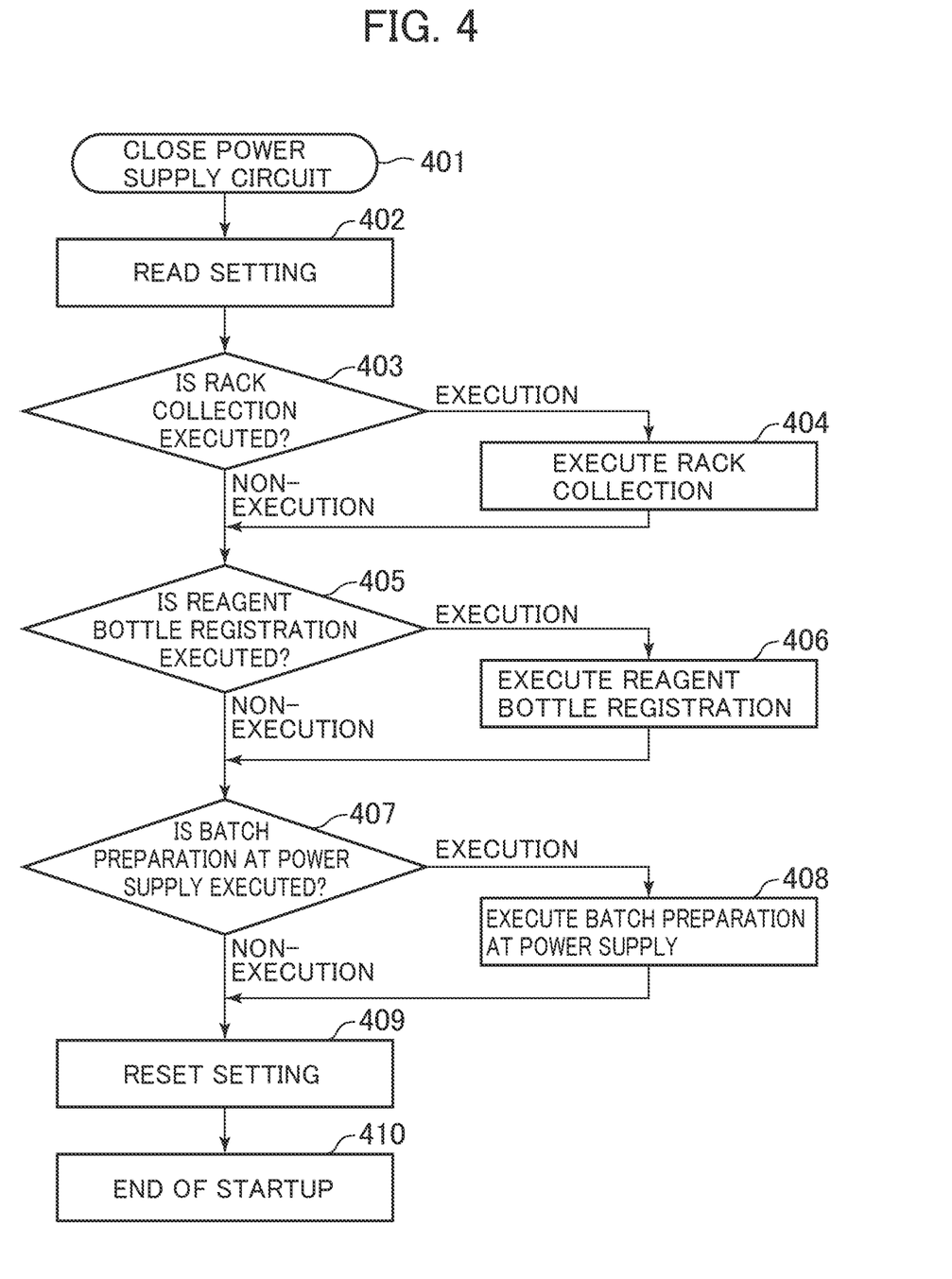
FIG. 4 is a flowchart representing exemplary process steps executed at restarting.

Referring to FIG. 4, the process to be executed by the operation section 102 at restarting (next startup) will be described. The operator's depression of the power (ON) switch shuts off the power supply circuit (step 401). Then each power source of the respective sections is turned on to start predetermined operations. Firstly, the computer operating system is activated to establish synchronization with the respective sections through communication.

Then the operation section 102 reads each state of the checkboxes set at the end of the previous process before execution of a series of operations set to be executed at startup (step 402).

After reading the setting, the operation section 102 judges whether the rack collection operation is set to "execution" or "non-execution" (step 403). If it is set to "execution", the operation section 102 executes the rack collection operation parallel to the mechanism reset operation (step 404). If it is set to "non-execution", the operation section omits execution of the rack collection operation (step 404) to proceed to step for judgment of the next operation item.

Then the operation section 102 judges whether the reagent bottle registration operation is set to "execution" or "non-execution" (step 405). If it is set to "execution", the operation section 102 executes the reagent bottle registration operation (step 406). If it is set to "non-execution", the operation section omits execution of the reagent bottle registration operation (step 406) to proceed to step for judgement of the next operation item.

The operation section 102 judges whether the batch preparation at power supply is set to "execution" or "non-execution" (step 407). If it is set to "execution", the operation section 102 executes the batch preparation operation at power supply (step 408). If it is set to "non-execution", the operation section 102 omits execution of the batch preparation operation at power supply (step 408).

At the end of the judgement with respect to all the read checked states of the operation items, the operation section 102 executes the setting reset process (step 409). In the setting reset process, all the contents of setting, which have been read in step 402 are initialized to execution of the operation. Thereafter, the operation section 102 executes the startup end process (step 410) for controlling the automatic analyzer 100 into the standby state. That is, the operation section 102 is brought on standby for the operator's instruction.

(1-5) Summary

Concerning the operation items which cannot be recognized by the operation section 102 unless they are executed but can be recognized by the operator, at the timing of the latest power shutdown (power shutdown during inspection), the automatic analyzer 100 allows preliminary setting of automatic execution/non-execution of those operation items at restarting.

Even if the power shutdown is required during inspection of the patient's sample (for example, the situation unintentionally requiring exchange of parts or maintenance for the respective parts specified to be carried out while turning off power in accordance with the instruction manual), the above-described function allows the operator to freely set to omit execution of the operation item at restarting (next startup). As a result, the operation to be automatically executed at restarting (next startup) may be limited only to the necessary operation. The automatic analyzer 100 may be recovered into the state that allows inspection within the shortest period of time.

The power shutdown screen 201 is displayed in response to the depression of the power (OFF) switch during the inspection. The resultant set content is only effective at restarting (next startup), and is different from the one effective at every startup. Therefore, this securely avoids the case where the automatic maintenance function cannot be activated at every startup subsequently due to forgetfulness of the operator with respect to resetting after cancelling the setting as described above. This example is configured to reset so that the operation item displayed on the power shutdown screen 201 is essentially executed (step 409). The operator is only required to uncheck the omittable operation item. There is no risk of deteriorating usability owing to increase in the number of operations at unexpected shutdown.

(2) Example 2

In the operation at the end of the process as shown in FIG. 3, the automatic analyzer 100 cannot be turned off until the operator's depression of the setting registration button 202 (step 303). In this example, the automatic analyzer 100 will be automatically turned off if the setting registration button 202 is not depressed after the elapse of a fixed time or longer.

Figure 5:
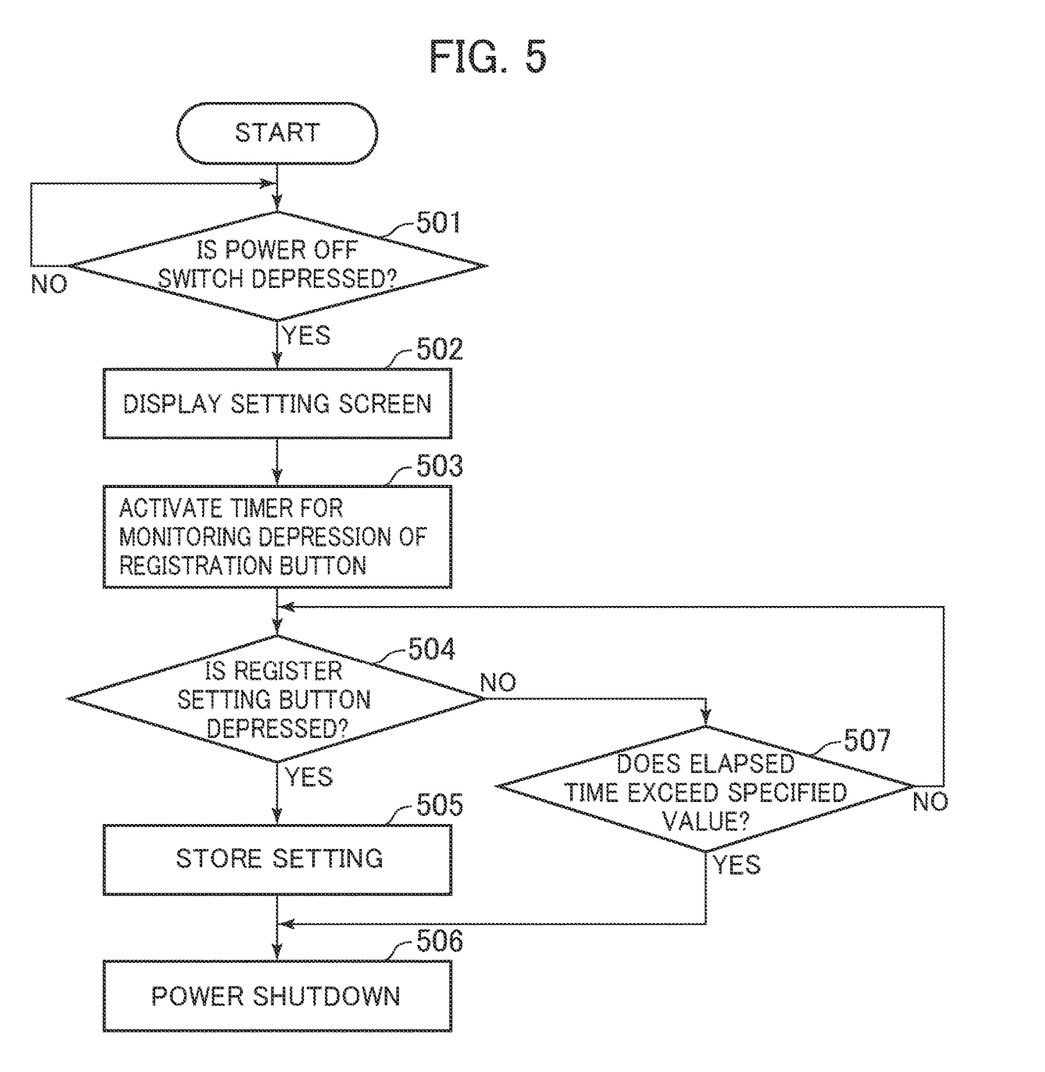
FIG. 5 is a flowchart representing other exemplary process steps executed at power shutdown during inspection.

Referring to FIG. 5, the process to be executed at power shutdown by the operation section 102 according to this example will be described. In this example, the operation section 102 constantly monitors whether the power (OFF) switch has been depressed during the inspection (step 501). Upon the operator's depression of the power (OFF) switch, the operation section 102 executes setting screen display process (step 502) to display the power shutdown screen 201 (FIG. 2) on the display 101.

The operation section 102 activates a timer for monitoring the time elapsing from the display of the power shutdown screen 201 (step 503). Then the operation section 102 judges whether the setting registration button 202 has been depressed (step 504). If the depression of the setting registration button 202 is not detected, the operation section 102 judges whether or not the elapsed time has exceeded the specified value (for example, 1 minute, 5 minutes or the like) (step 507). If the elapsed time does not exceed the specified value, the operation section 102 returns to step 504.

If depression of the setting registration button 202 is detected in step 504, the operation section 102 stores the setting relating to "execution" or "non-execution" of the operation item in the not shown storage section (for example, hard disk) (step 505), and executes the power shutdown process (step 506). Meanwhile, if the operator's depression of the setting registration button 202 is not detected even if the elapsed time exceeds the specified time, the operation section 102 directly proceeds to power shutdown process (step 506) from step 507.

As described above, in this example, even if the operator forgets to depress the setting registration button 202 (the power shutdown during the inspection is generally considered as a contingency, and the operator is highly likely to forget to depress the setting registration button 202 because the operator may be busily occupied in doing various operations), it is possible to prevent the power shutdown state from being kept for long hours. As a result, the restarting may be executed with no delay, securing to return to the state ready for the inspection.

In the case of power shutdown without registering the setting contents as described in this example, the setting of the power shutdown screen 201 is reset at restarting (next startup) of the automatic analyzer 100 (step 409). Therefore, all the operation items displayed on the power shutdown screen 201 are executed.

If the function according to this example is not installed, power shutdown and restarting will be executed after the operator finds that he/she has forgotten to depress the setting registration button 202. Even in the case of omitting execution of some of the operation items, there is a high possibility of delay in returning to the state ready for the inspection compared with this example.

(3) Other Examples

The present invention is not limited to the examples as described above, and includes various modifications.

(3-1)

Referring to the power shutdown screen 201 (FIG. 2), for example, the state where the checkboxes are checked is specified as the normal state ("execution" of all items refers to the normal state). It is also possible to specify the state where all the checkboxes are unchecked as the normal state. In other words, "non-execution" of all items may be specified as the normal state. In such a case, the checkbox corresponding to the operation required to be executed has to be checked. Which state is the normal state is not the essence of the invention.

(3-2)

In the above-described example, if the checkbox 205 corresponding to the batch preparation operation upon power supply is unchecked, execution of all the operations set for the batch preparation operation is omitted. It is also possible to display additional checkboxes corresponding to the operations set for the batch preparation operation so as to allow the operator to select execution of the individual operations.

(3-3)

The explanation of the above-described example has been made that the single unit of the analysis section 104 is employed. However, a plurality of analysis sections 104 may be employed for the automatic analyzer 100. In this case, it is possible to allow designation whether or not the state of the single checkbox is made equally applicable to another or the plurality of analysis sections 104. It is possible to add the checkboxes by the number corresponding to the individual analysis sections 104 so as to allow individual designation of the operation item to "execution" or "non-execution" of the respective analysis sections 104. In the latter case, the power shutdown screen 201 is displayed so as to clarify each relation between the respective checkboxes and corresponding analysis sections 104. In such a case, the operation section 102 reads the setting contents of the respective checkboxes individually from the storage section so that it is judged whether or not the operation items are individually executed when power is turned ON with respect to the individual analysis sections 104.

(3-4)

A large number of automatic analyzers 100 have log functions for confirming operation states. It is possible to configure the analyzer to store omitted operation items in the log in accordance with the operator's setting so as to be confirmed through the log function. In order to positively notifying the operator of omitted execution of the specific operation item, the operation section 102 is allowed to display the screen indicating the omitted operation item (for example, a screen 601 indicating the operation state at startup as shown in FIG. 6) on the display 101 before initializing the setting in the setting reset process (step 409).

The screen 601 indicating the operation state at startup displays the operation item corresponding to the power shutdown screen 201 as well as messages "Execution of operations at startup has been omitted", and "Execution of the checked operation has been omitted following the operator's instruction". Specifically, the screen displays a checkbox 603 indicating execution or non-execution of the rack collection operation, a checkbox 604 indicating execution or non-execution of the reagent bottle registration, and a checkbox 605 indicating execution or non-execution of the batch preparation operation upon power supply.

Figure 6:
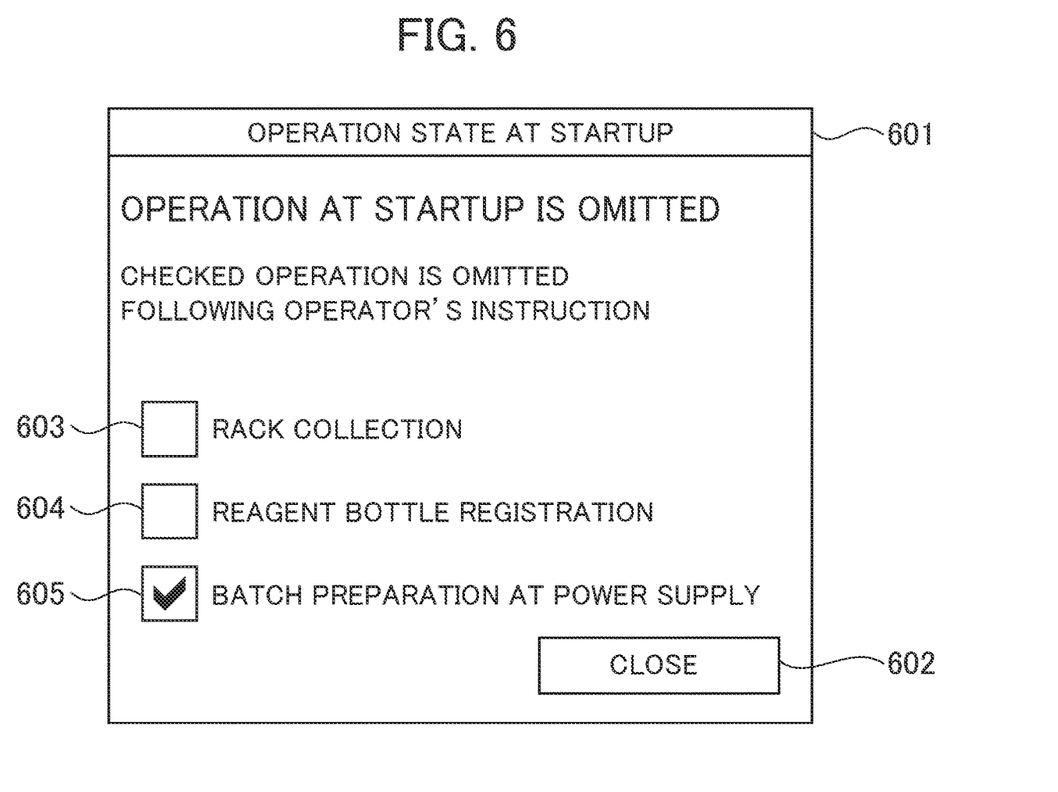
FIG. 6 is a view showing an exemplary screen displaying the condition of the startup operation at restarting.

Referring to FIG. 6, the display shows the checked checkbox 605 corresponding to the omitted batch preparation operation upon power supply in accordance with the setting through the power shutdown screen 201 (FIG. 2). Upon the operator's depression of a close button 602, the operation section 102 exits the current screen from the display 101. The omitted operation item may be notified using notification means other than the display 101 (for example, speaker, LED and the like). The screen 601 indicating the operation state at startup may be displayed at the timing except the startup.

(3-5)

The above-described examples have been described in detail for easy understanding of the present invention. It is to be understood that all the components as described above do not have to be necessarily provided. It is possible to replace a part of the structure of one example with the structure of another example. It is also possible to add the structure of an example to the structure of another example. It is still possible to eliminate the part of the structure of each of the examples.

It is possible to partially or entirely implement the above-described structure, function, processing section, processing means and the like by means of hardware, for example, by designing with the integrated circuit. It is also possible to implement the above-described structures and functions (by means of software) through interpretation and execution of the program by which the processor executes the respective functions. The information of the program, table, file and the like for implementing the respective functions may be stored in the storage device such as the memory, the hard disk, and the SSD (Solid State Drive), or the recording medium such as the IC card, the SD card, the DVD and the like. The control lines and information lines regarded as necessary for the explanation are shown. It is to be understood that those lines do not necessarily indicate all the control lines and the information lines necessary for the product. Actually, almost all the components may be considered as being interconnected with one another.

LIST OF REFERENCE SIGNS

101: display,
102: operation section,
103: sample charging section,
104: analysis section,
105: sample storage section,
106: sample carrier section,
107: connection cable,
108: sample container,
111: sample dispensation mechanism,
112: first reagent dispensation mechanism,
113: second reagent dispensation mechanism,
114: reaction disk,
115: reagent disk (reagent storage section),
116: reagent bottle,
201: power shutdown screen,
202: setting registration button,
203: checkbox corresponding to rack collection operation,
204: checkbox corresponding to reagent bottle registration operation,
205: checkbox corresponding to batch preparation operation at power supply,
601: startup operation state screen,
602: close button,
603: checkbox corresponding to rack collection operation,
604: checkbox corresponding to reagent bottle registration operation,
605: checkbox corresponding to batch preparation operation at power supply

The invention claimed is:

1. An automatic analyzer comprising:
a sample storage section for accommodating a plurality of sample containers;
a reagent storage section for accommodating a plurality of reagents;
a sample carrier section configured to move the plurality of sample containers between an analysis section and the sample storage section, wherein each of the plurality of sample containers contains one or more samples, wherein
the analysis section is configured to carry out analysis by reacting the one or more samples in each of the plurality of sample containers along the sample carrier section with at least one reagent among the plurality of reagents;
a display;

a computer coupled to the analysis section, the display and the sample carrier section, the computer programmed to:

control the analysis section to analyze one or more reactions between the one or more samples contained in each of the plurality of sample containers along the sample carrier section with the at least one reagent among the plurality of reagents, upon receiving a power off instruction to power off the automatic analyzer and in response to receiving the power off instruction to power off the automatic analyzer, display a screen on the display that enables selection or deselection of each of a plurality of processes to be automatically performed upon powering on the automatic analyzer after the power off of the automatic analyzer, the plurality of processes including a first process of moving any remaining ones of the plurality of sample containers containing the one or more samples in the sample carrier section to the sample storage section and a second process of determining a change of whether an additional reagent container has been newly mounted on the reagent storage section or whether a reagent bottle among the plurality of reagent bottles has been removed from reagent storage section, receiving and storing the selection or deselection of the first process or the second process via the screen, powering off the automatic analyzer, and upon powering on the automatic analyzer after the power off of the automatic analyzer, automatically determine whether the first process was selected via the screen and automatically determine whether the second process was selected via the screen based on the respective stored selection or deselection of the first process and the second process, and automatically execute the first process only if the first process was selected via the screen based on the automatic determination of the first process and automatically execute the second process only if the second process was selected via the screen based on the automatic determination of the second process.

2. The automatic analyzer according to claim 1, wherein the computer is programmed to:

power off the automatic analyzer without storing the selection or deselection after an elapse of a predetermined time from display of the screen that enables selection or deselection of each of the plurality of processes.

* * * * *